(12) United States Patent
Schneider et al.

(10) Patent No.: US 11,624,318 B2
(45) Date of Patent: Apr. 11, 2023

(54) THERMAL ENERGY STORAGE SYSTEM COMPRISING A PACKED-BED HEAT STORAGE UNIT AND A PACKED-BED COLD STORAGE UNIT, AND METHOD FOR OPERATING A THERMAL ENERGY STORAGE SYSTEM

(71) Applicant: ENOLCON GMBH, Bietigheim-Bissingen (DE)

(72) Inventors: Günter Schneider, Bietigheim-Bissingen (DE); Hartmut Maier, Stuttgart-Botnang (DE)

(73) Assignee: ENOLCON GMBH, Bietigheim-Bissingen (DE)

( * ) Notice: Subject to any disclaimer, the term of this patent is extended or adjusted under 35 U.S.C. 154(b) by 0 days.

(21) Appl. No.: 17/761,291

(22) PCT Filed: Oct. 2, 2020

(86) PCT No.: PCT/EP2020/077674
§ 371 (c)(1),
(2) Date: Mar. 17, 2022

(87) PCT Pub. No.: WO2021/069327
PCT Pub. Date: Apr. 15, 2021

(65) Prior Publication Data
US 2022/0389866 A1 Dec. 8, 2022

(30) Foreign Application Priority Data
Oct. 11, 2019 (DE) ...................... 10 2019 127 431.1

(51) Int. Cl.
*F02C 6/14* (2006.01)
*F28D 20/00* (2006.01)

(52) U.S. Cl.
CPC ............ *F02C 6/14* (2013.01); *F28D 20/0056* (2013.01); *F05D 2260/213* (2013.01);
(Continued)

(58) Field of Classification Search
CPC ................... F02C 6/14; F28D 20/0056; F28D 2020/0078; F28D 2020/006;
(Continued)

(56) References Cited

U.S. PATENT DOCUMENTS 3,218,807 A * 11/1965 Berchtold ................. F02C 9/24
60/650
3,956,899 A * 5/1976 Kronogard ............. F02C 1/105
60/682
(Continued)

FOREIGN PATENT DOCUMENTS

DE 102010055997 A1 6/2012
EP 2390473 A1 11/2011
(Continued)

OTHER PUBLICATIONS

English language Abstract of DE102010055997A1.

*Primary Examiner* — Hoang M Nguyen
(74) *Attorney, Agent, or Firm* — Ware, Fressola, Maguire & Barber LLP

(57) ABSTRACT

The invention relates to a system and a method for storing electrical energy which are based on a closed thermodynamic cycle. They make it possible to store electrical energy in a very efficient, cost-effective, and safe manner. No environmentally hazardous or expensive materials are required. The system comprises a compressor, a turbine, and two packed-bed storage units which are operated at different temperature levels.
In order to load the packed-bed storage units, the cycle is operated as a counterclockwise heat pump process. In this process, the heat generated at the outlet of the compressor is expanded at a high temperature level into a first packed-bed (Continued)

storage unit and stored therein. The "cold" produced during the subsequent expansion of the gaseous working medium in a turbine is stored in a second packed-bed storage unit. This requires mechanical energy which is provided by an electrical machine. In order to discharge the energy storage system, the cycle is operated in reverse (i.e., as a clockwise cycle). Before entering the compressor, the working medium is cooled with the cold stored in the second packed-bed storage unit and, after compression, absorbs the heat from the high-temperature packed-bed storage system. The hot working medium at high pressure is expanded by means of the turbine and thus energy is generated.

20 Claims, 14 Drawing Sheets

(52) U.S. Cl.
CPC .... *F05D 2260/232* (2013.01); *F05D 2260/42* (2013.01); *F28D 2020/0078* (2013.01)

(58) Field of Classification Search
CPC ......... F05D 2260/213; F05D 2260/232; F05D 2260/42; F01K 3/12; F01K 7/16; F01K 25/103; F25B 11/02; F25B 30/02

USPC .................................. 60/650, 659, 682–684
See application file for complete search history.

(56) References Cited

U.S. PATENT DOCUMENTS

| | | |
|---|---|---|
| 2010/0257862 A1 | 10/2010 | Howes et al. |
| 2010/0263378 A1* | 10/2010 | Van Rij ................. F01K 27/005 60/682 |
| 2015/0260463 A1* | 9/2015 | Laughlin ................. F01K 13/02 165/104.31 |
| 2016/0298455 A1 | 10/2016 | Laughlin et al. |
| 2018/0187597 A1 | 7/2018 | Apte et al. |
| 2018/0187627 A1* | 7/2018 | Apte ......................... F02C 1/08 |
| 2019/0195571 A1 | 6/2019 | Laughlin et al. |
| 2019/0195671 A1 | 6/2019 | Bottner et al. |
| 2019/0212070 A1 | 7/2019 | Laughlin et al. |

FOREIGN PATENT DOCUMENTS

| | | |
|---|---|---|
| EP | 2400120 A1 | 12/2011 |
| WO | 2012017041 A2 | 2/2012 |

\* cited by examiner

THERMAL ENERGY STORAGE SYSTEM COMPRISING A PACKED-BED HEAT STORAGE UNIT AND A PACKED-BED COLD STORAGE UNIT, AND METHOD FOR OPERATING A THERMAL ENERGY STORAGE SYSTEM

BACKGROUND OF THE INVENTION

1. Field of Invention

The invention relates to a method for storing electrical energy (electricity storage system) based on a known thermodynamic cycle. The heat source is a high-temperature heat storage unit; the heat sink is a low-temperature thermal storage unit (cold storage unit), hereafter referred to as a cold storage unit. Furthermore, the cycle comprises at least one compressor and a turbine. The compressor and the turbine are connected to an electrical machine (motor, generator, or motor generator).

2. Description of Related Art

The storage of electrical energy is becoming more important with the increasing generation of electrical energy via solar and wind energy. Various systems are known, such as pumped storage power plants and battery storage systems, (accumulators), chemical storage systems, and high-temperature thermal storage systems. Without addressing the advantages and disadvantages of the known storage systems, it is apparent that there is a great and growing demand for reliable, secure, and profitable storage systems.

The invention relates to thermal storage systems. Such thermal storage systems are described in detail in US 2016/0298455 A1, US 2019/0195671 A1, US 2019/0212070 A1, and US 2019/0195571 A1. The cycle described therein comprises one adiabatic compression and one adiabatic expansion, one isobaric heat transfer at high temperatures, and one isobaric heat transfer at low temperatures. This cycle is known as a joule process or "Brayton cycle".

The cycle is operated as a counterclockwise (heat pump) cycle to load such a thermal storage system. The compressor is driven by an electrical machine. The high-temperature heat accrued in the beginning or during an interim stage of the compressor is stored in the high-temperature thermal storage system. The gaseous work medium has a very low temperature, such as −70° C., following expansion in the turbine. With this very cold work medium the liquid heat carrier of the cold storage unit is cooled; the cold storage unit is loaded.

To unload the thermal storage system, the system is operated in a clockwise thermodynamic "work" cycle. The resulting work is converted into electrical energy by an electrical machine operated by the turbine. After the work medium is adiabatically compressed in the compressor (and thus also heated), the work medium is further heated with heat from the high-temperature heat storage unit before being unloaded in the turbine. The work medium is then cooled with the cold storage unit before returning to the compressor. Details can be found in the aforementioned published patent applications.

Liquid salt or a liquid saline mixture are used as a storage medium in the high-temperature heat storage units described in US 2016/0298455 A1, US 2019/0195671 A1, US 2019/0212070 A1, and US 2019/0195571 A1. The operating temperatures of this high-temperature heat storage medium are determined by the melting point (200° C. to 320° C.) and decomposition point (560° C. to 570° C.) of the salt or saline mixture. The temperature interval is thus within the range in which the salt storage system is operational as a heat storage unit, namely between about 230° C. and 570° C. This temperature interval limits the storage capacity of the high-temperature heat storage unit.

US 2018/0187597 A1, EP 2 390 473 A1, and EP 2 400 120 A1 describe thermal energy storage systems that comprise two tanks each for the liquid heat storage medium on the hot and cold side.

The temperature of the work medium is thus also specified at the turbine entrance, and the efficiency of the conversion of thermal energy into electrical energy is accordingly relatively low. Both have a negative impact on the current-to-current efficiency.

The cold storage unit also works with a liquid storage medium, such as hexane, at low temperatures of about −50° C. or lower. The lower limit of the operating temperature of the cold storage unit is determined by the freezing point/melting point of the liquid storage medium. There is also an upper limit to the temperature, as the heat storage medium must not evaporate into steam.

In these systems, it is particularly disadvantageous that multiple gas-liquid heat exchangers are required. In order for the thermodynamic cycle process with salt and cooling agent as a heat carrier to still be effective, a gas-gas heat exchanger (recuperator) must be installed between the turbine exit and the compressor entrance.

When using molten salt, the high-temperature heat storage unit requires at least three heat exchangers in order to safely prevent solidification of the liquid salt. Further gas-liquid heat exchangers are required for the cold storage unit. Each heat exchanger worsens the efficiency of the entire process due to the temperature differences.

Furthermore, operation of such a complete system is very complex, as it must be ensured during input and switching between loading and unloading that the temperatures in the high-temperature heat exchanger are always so high at every point that the salt by any means cannot be solidified. Not only does the interaction between the compressor and turbine sides of the cycle have to be precisely determined, but the interaction between the mass flows of the liquids or pumps of the tank systems on the cold and hot sides as well. Much attention has thus been paid to this matter in the aforementioned patent family.

Salt storage systems, often only shown in a heavily simplified manner in the literature as two-tank systems with a heat exchanger and a pump, are in practice complex systems with large, insulated tanks, special, cooled bases, high requirements for the pumps for the liquid salt and for systems that safeguard against solidification, and circulation systems. The effort required for maintenance and repair is also high. Corrosion is another challenge. Furthermore, the electrical consumption of the salt pumps and cooling agent pumps in the cold tanks must also be considered in the overall performance or current-to-current efficiency as separate consumption.

The invention aims to provide a thermal storage system that avoids the disadvantages of the state of the art described above. In particular, considerably better current-to-current efficacies shall be achieved with reduced costs and lower requirements to materials and component security.

Advantages of the Invention

Operation of the thermal energy storage system is relatively simple, safe, and profitable, because the operating pressures in the cycle are relatively low and the mineral storage materials are non-toxic and easy to handle.

The gaseous heat carriers of the high-temperature heat storage unit and the cold storage unit only have to overcome a relatively low flow resistance due to the favorable arrangement of the storage material, and the energy needs of the blower are low. Under consideration of the flaps and lines, it is less than 100 mbar even in very large systems, and can generally be even less than 50 mbar depending on the detailed design. The storage systems work under ambient pressure. This means that the wall thickness of the storage modules and the lines can be very small.

The main difference with using this high-temperature heat storage unit as a cold storage unit lies in the fact that, at temperatures below 0° C., a heat transport medium other than air is preferably used, because moisture in the air cools in cold temperatures and can in particular freeze the flaps and blower. This is why a corresponding cold storage unit is preferably designed as a closed system with nitrogen $N_2$, or carbon dioxide $CO_2$, or argon Ar, or helium He, or a different gas or gas mixture that does not condensate or freeze in the required operating temperatures.

With the packed-bed storage system as a high-temperature heat storage unit and/or as a cold storage unit, the cycle can be operated at considerably lower pressures than when salt storage systems and cooling agents are used.

This results in the packed-bed cold storage unit being preferably directly integrated into the heat pump process, and that one thus not only can omit the heat exchanger, but also improves the efficiency, as the temperature differences in the heat exchanger are omitted.

With the packed-bed storage systems described by the invention, temperature spreads of 900° C. or more can be realized (presumption: storage temperature of the high-temperature heat storage unit at 800° C., storage temperature of the cold storage unit at −100° C.).

In the known systems with liquid salt and a liquid storage medium in the cold storage unit, the maximum temperature spread is approx. 650° C. (=570° C.— (−80° C.)). The temperature spread has a direct impact on the current-to-current efficiency. This is one reason why the current-to-current efficiency of the thermal energy storage system described by the invention is significantly higher than the current-to-current efficiency of the aforementioned, known systems.

If one takes a closer look at the thermodynamics, one ascertains that the suggested packed-bed storage systems can optimize the temperature interaction of the hot and cold side such that, when the same process medium is in the cycle, the maximum pressures on the hot side can, with approx. 8 to 14 bar (with nitrogen $N_2$), be well below the necessary pressures when using a salt storage system, namely more than 60 bar (with nitrogen $N_2$) and more than 30 bar with other gases (e.g., argon Ar). This results in considerable simplifications with regard to material selection, required wall thicknesses, etc. and security.

The aforementioned task is achieved by the method for loading and unloading according to claims 9 to 12. The loading and unloading differ only in the direction of the cycle. The first and second heat transfer system can remain unchanged. This means that the operation is conceivably simple and robust.

Further benefits and beneficial variants can be found in the following illustrations and their descriptions.

DESCRIPTION OF THE EXAMPLE VARIANTS

In the figures, the same reference numbers are used for the same components, and only the components and parts required to understand the invention are shown. Commonly required further devices for operating such a system are not shown. Of course, safety valves must also be provided, the low-pressure part must be tightly lockable so that no excessive pressure can form in the cold storage modules in the event of turbine failure, compensation containers are required, etc. Any additional coolers required for stable operation are not shown either.

DETAILED DESCRIPTION OF THE BEST MODE OF THE INVENTION

Figure 1:
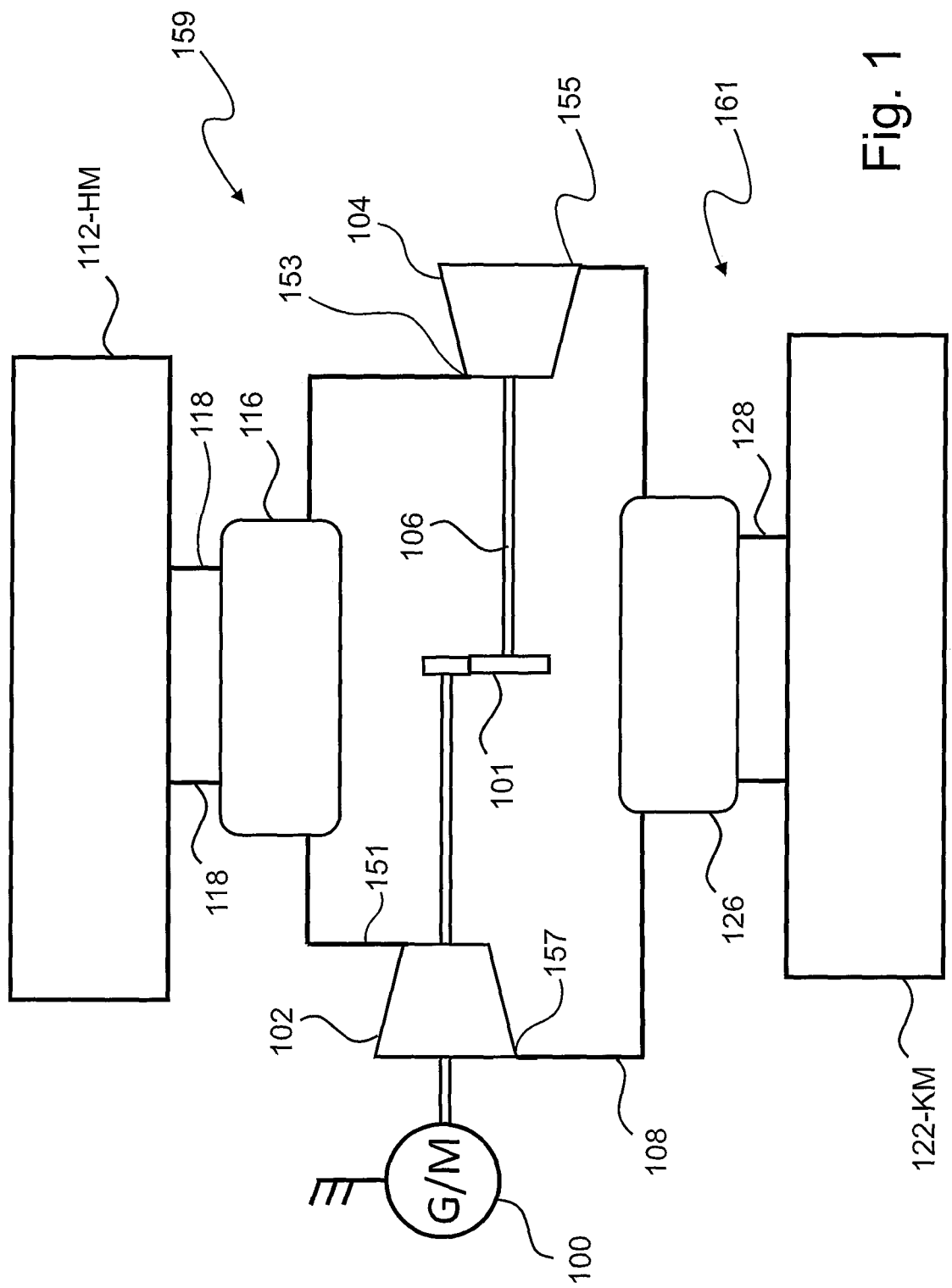
FIGS. 1 to 5: Block diagrams of example variants of thermal energy storage systems according to the invention.

The thermal energy storage system in the first example variant shown in FIG. 1 comprises a compressor 102, an electrical machine 100, and a turbine 104. A first heat exchanger 116 is positioned between an "outlet" 151 of the compressor 102 and an "inlet" 153 of the turbine 104.

Between an "outlet" 155 of the turbine 104 and an "inlet" 157 of the compressor 102 is a second heat exchanger 126. The terms "outlet" and "inlet" are in quotation marks because this is based on a counterclockwise "heat pump" cycle. However, the system can also be configured as a clockwise "work" cycle. Then the compressor 102 is operated as an expansion turbine, the turbine 104 is operated as a compressor, and the flow direction of the work medium changes as well.

The first heat exchanger 116 is connected with a packed-bed high-temperature heat storage unit 112-HM via a first heat transfer system 159. Only two lines 118 of the first heat transfer system 159 are visible in FIG. 1.

The second heat exchanger 126 is connected with a packed-bed cold storage unit 112-KM via a second heat transfer system 161. Only two lines 128 of the second heat transfer system 161 are visible in FIG. 1.

Both heat transfer systems 159, 161 work with a gaseous heat carrier that transfers heat to the solid storage material of the high-temperature heat storage unit 112-HM during loading; during unloading, it picks up heat from the hot storage material. When loading the cold storage unit 112-KM, the heat carrier removes heat from the storage material so that it cools. During unloading, it emits heat onto the storage material of the cold storage unit 122-KM and thus cools off.

The second heat transfer system 161 can, for example, be operated with argon, nitrogen $N_2$, $CO_2$, and other gases or gas mixtures as a heat carrier. In the first heat transfer system 159, air can also be used as a heat carrier.

The high-temperature heat storage unit 112-HM and the cold storage unit 122-KM essentially have the same structure. The structure and function are described in DE 10 2010 055 997 A1 and WO 2012/017041 A1 based on this, which are referred to here.

Figure 2:
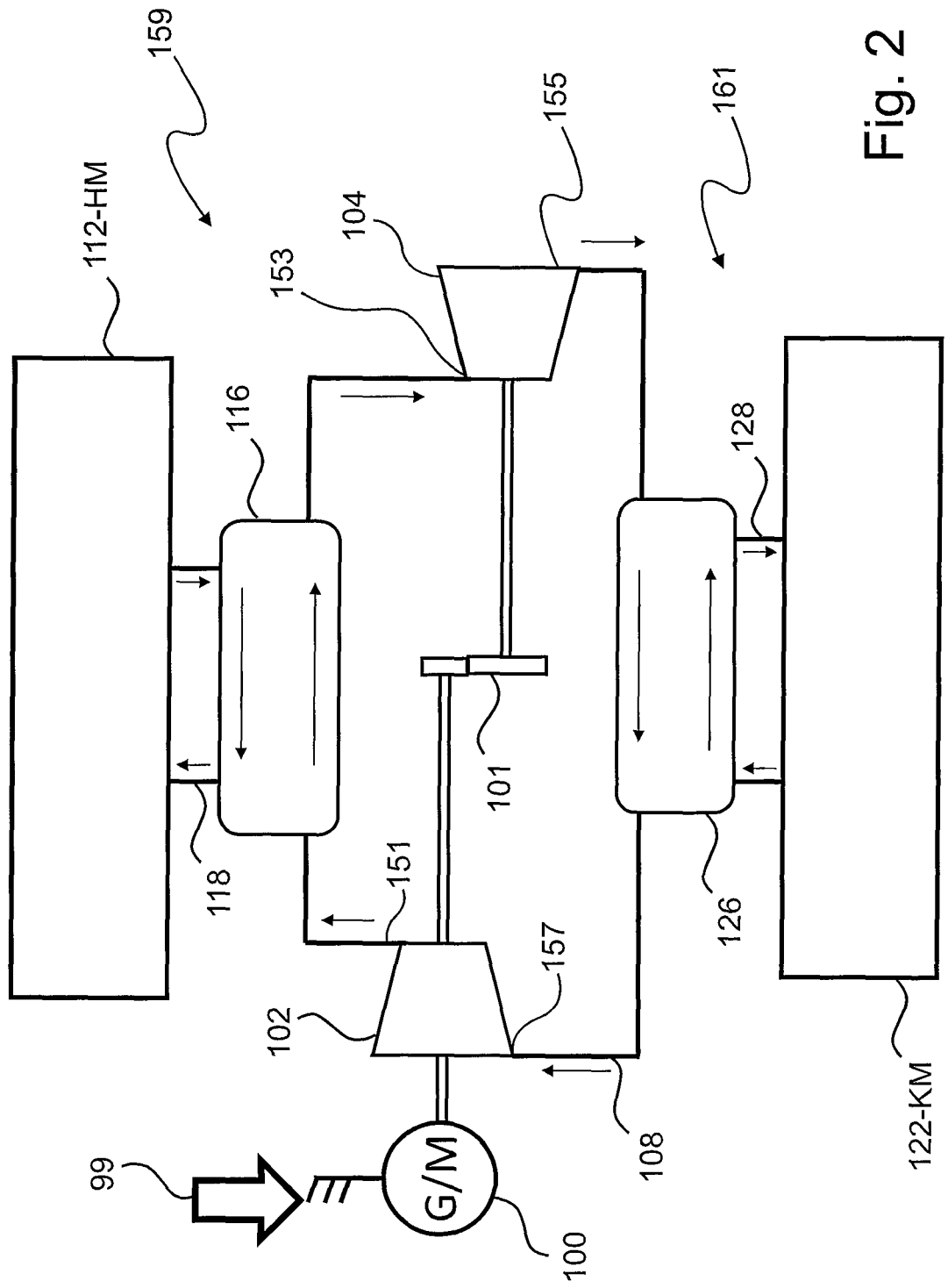

The thermal energy storage systems are loaded in FIG. 2. The respective flow directions of the three gaseous media are indicated in FIG. 2 with arrows.

During loading, the electrical machine 100 is used as a motor; it drives the compressor 102. A counterclockwise heat pump cycle thus occurs.

A heat transfer from the hot work medium 108 onto the likewise gaseous heat carrier of the first heat transfer system 159 takes place in the first heat exchanger 116. The high-temperature heat storage unit 112-HM is loaded with the thus heated heat carrier from the first heat transfer system 159.

A heat transfer takes place in the second heat exchanger 126 from the very cold work medium 108 exiting the turbine 104 (e.g., temperature of −100° C.) to the gaseous heat carrier of the second heat transfer system 161. The cold storage unit 122-KM is loaded, i.e., cooled, with the thus cooled heat carrier of the second heat transfer system 161.

Figure 3:
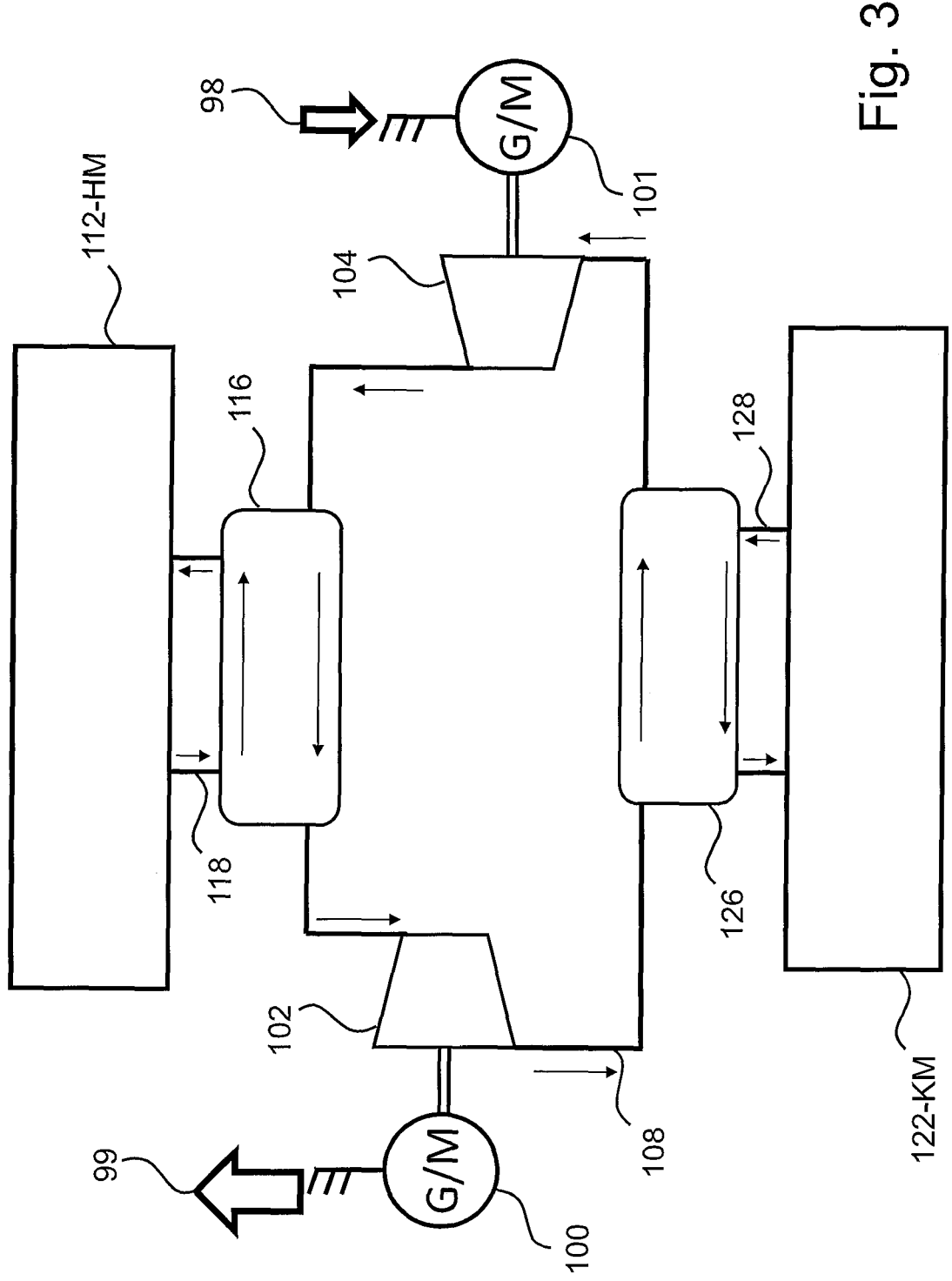

The unloading of a thermal energy storage system described by the invention is explained by a second example variant shown in FIG. 3. In the second example variant, the compressor 102 and the turbine 104 are not mechanically connected; both the compressor 102 and the turbine 104 are instead each connected with an electrical machine 100, 101. The functionality of all example variants is largely the same, so that the loading and unloading are exemplified by one variant. It is possible for a man skilled in the art to carry this over to another variant, as the function principle is the same for all variants, or at least there are significant commonalities.

During unloading, the "turbine" 104 works as a compressor and is driven by the electrical machine 101. In the first heat exchanger 116, the work medium already heated by the compression in the "turbine" 104 is heated further. This is achieved in that the heat carrier of the first heat transfer system 159 passes through the hot storage material of the high-temperature heat storage unit 112-HM, and is heated up to 1000° C. or more. This high heat is transferred onto the work medium in the first heat exchanger 116.

As a result, the heat carrier of the second heat transfer system 161 in the second heat exchanger 126 cools the work medium before entry at 155 into the turbine 104 functioning as a compressor, and thereby unloads the cold storage unit 122-KM.

Figure 4:
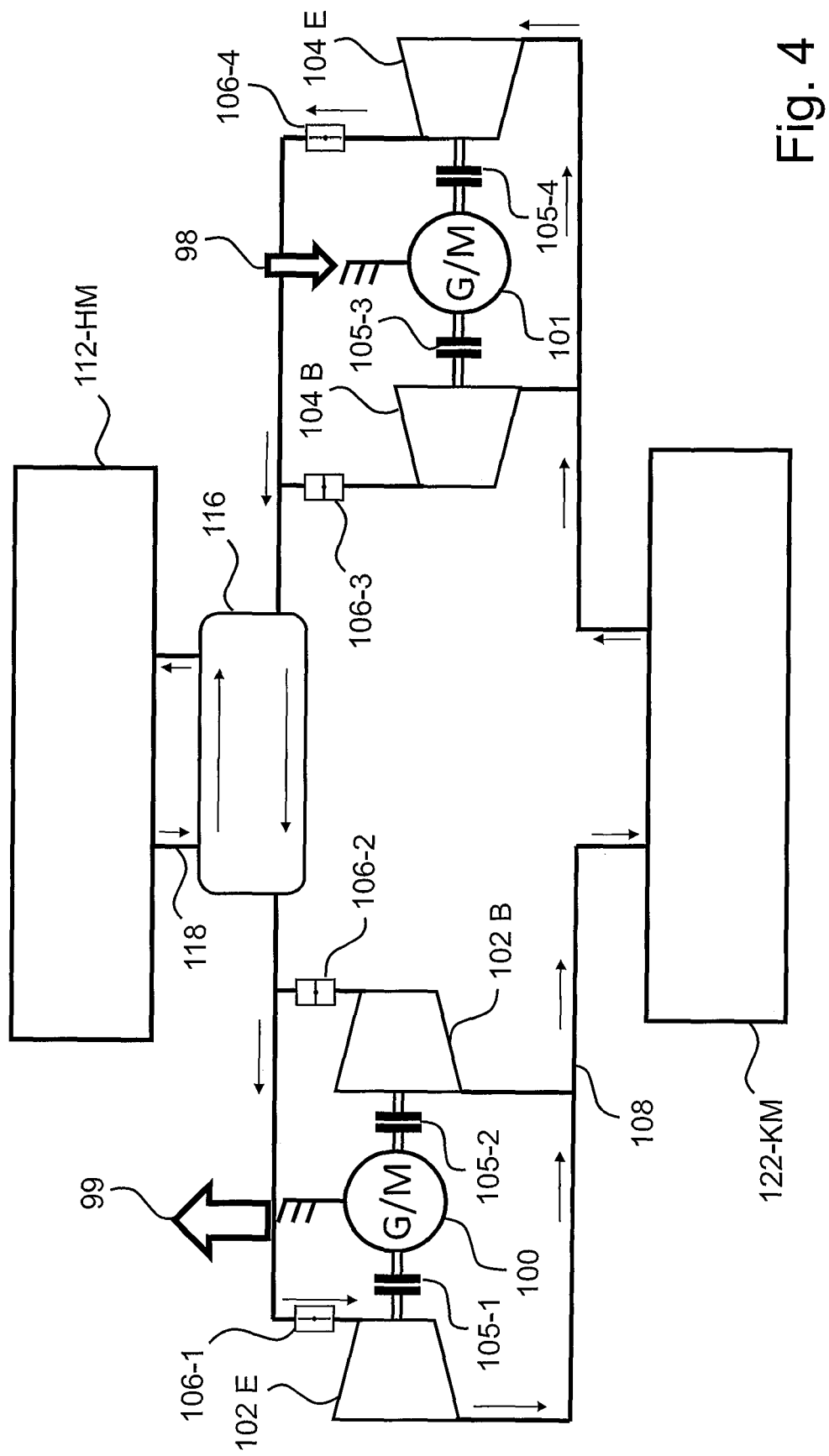

FIG. 4 schematically shows another variant. It considers the fact that it is often not possible to configure the one- or multi-stage turbine 104 such that it also works effectively or very effectively when operating as a compressor. This applies accordingly to the one- or multi-stage compressor 102.

This variant contains two compressors 102-B, 104-E and turbines 104-B and 102-E. There are two electrical machines 100, 101 that can work in generator and motor mode. Couplings 105 can be connected with an electrical machine via the required system components (compressors and turbines), and the inactive ones can be uncoupled.

Figure 5:
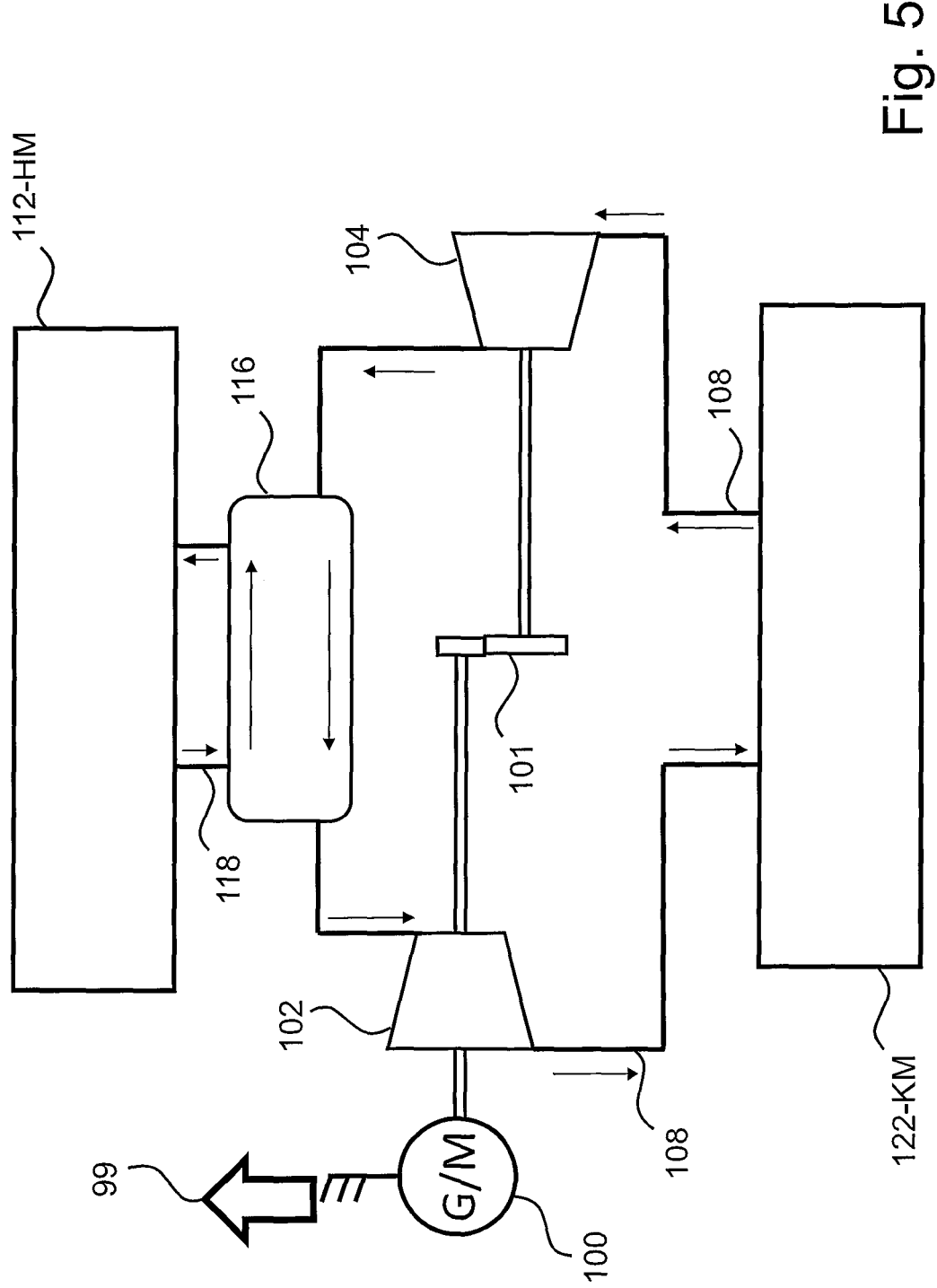

Only a first heat exchanger 116 and a first heat transfer system 159 are present in the example variants shown in FIGS. 4 and 5. Unlike the aforementioned example variants, the work medium of the cycle flows directly through the cold storage unit 112-KM. The second heat exchanger 126 and the second heat transfer system 161 are omitted, and the work medium of the cycle flows directly through the cold storage unit 122-KM.

There are many advantages to this. Perhaps the most obvious is that the investment costs and space requirements are much lower. Furthermore, the current-to-current efficiency of the thermal energy storage system is improved, as the temperature differences are omitted during the transfer from the storage material to the heat carrier of the second heat transfer system 161, and from this heat carrier onto the work medium of the cycle in the second heat exchanger 126.

On the high-temperature side, the loading and unloading are unchanged and occur as described above. The loading and unloading of the cold storage 122-KM occur in that the work medium flows through the cold storage unit 122-KM.

The thermal energy storage system is unloaded in FIG. 4. This is based on switch positions of the armatures 106-1 to 106-4 as well as the flow directions of the work medium and the heat carrier of the heat transfer systems 159 and 161. During unloading, the compressor 104-E is driven by the electrical machine 101. The coupling 105-4 is closed and the coupling 105-3 is open. The turbine 102-E drives the electrical machine 100, which feeds power into the grid via the line 99. The coupling 105-1 is closed and the coupling 105-2 is open.

The armatures 106-1 and 106-4 are open. The armatures 106-2 and 106-3 are closed, so that the unused compressor 102-B and the unused turbine 104-B are disconnected from the cycle.

To load the thermal energy storage system, the compressor 102-B is driven by the electrical machine 100. The coupling 105-3 is closed and the coupling 105-4 is open. The turbine 104-B drives the electrical machine 101, which feeds power into the grid via the line 98. The coupling 105-2 is closed and the coupling 105-1 is open.

The armatures 106-2 and 106-3 are open. The armatures 106-1 and 106-4 are closed so that the unused compressor 104-E and the unused turbine 102-E are disconnected from the cycle.

The example variant shown in FIG. 5 is to a certain extent a variant of the form shown in FIG. 1 in which, as shown in FIG. 4 and described in relation to it, the work medium flows directly through the cold storage unit; the second heat exchanger 126 and the second heat transfer system 161 are omitted.

FIGS. 6 to 12 are somewhat more detailed depictions, in particular of the high-temperature heat storage unit 112-HM, the cold storage unit 122-KM, the first heat transfer system 159, and the second heat transfer system 161.

Figure 6:
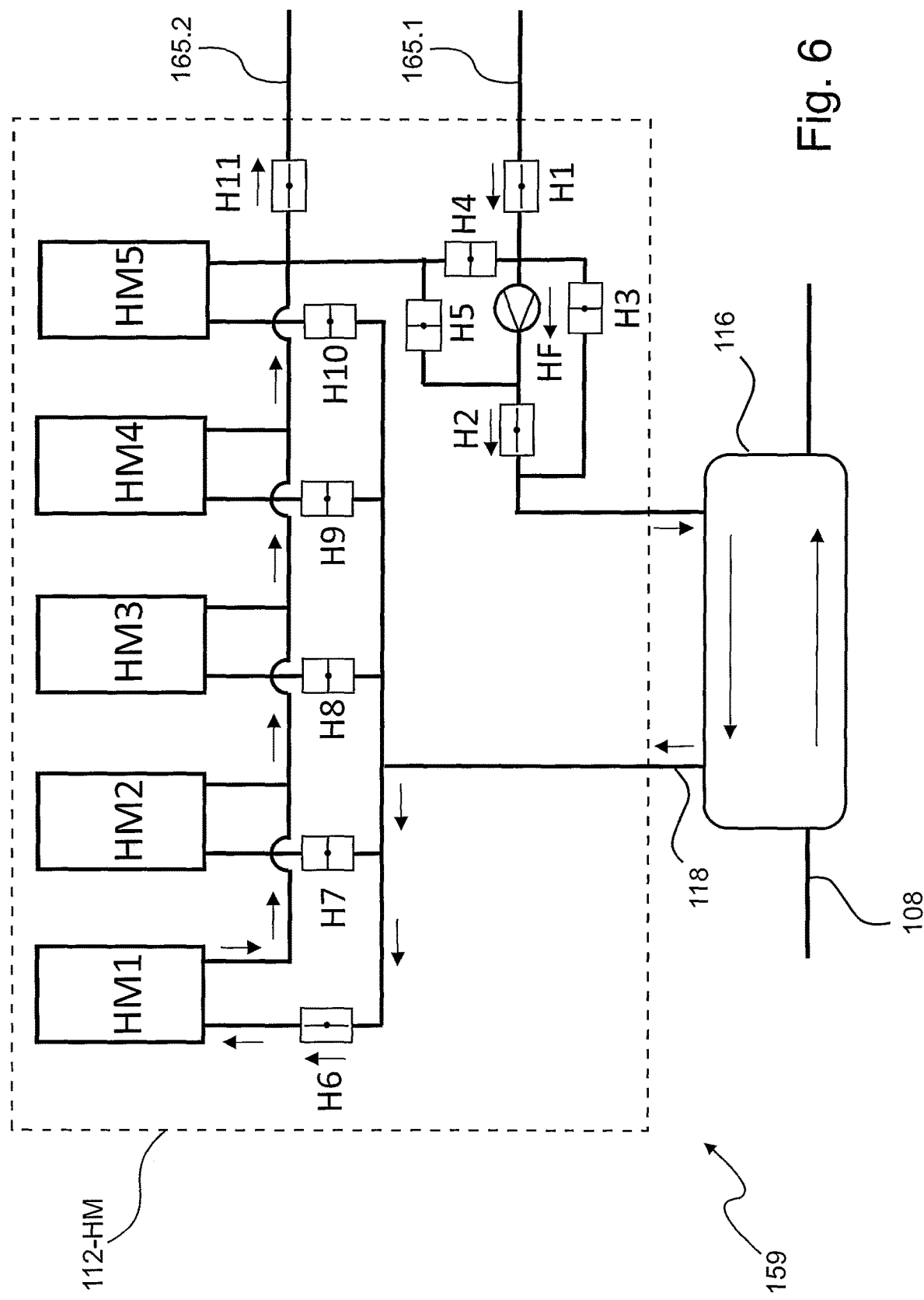
FIGS. 6 to 11: Explanatory block diagrams.

FIG. 6 shows the high-temperature heat storage unit 112-HM and the first heat transfer system 159 in somewhat more detail. The high-temperature heat storage unit 112-HM comprises multiple high-temperature heat storage modules HM1 to HM5, wherein the number of modules can be freely determined. Essentially, the number of modules can be as high as one wishes, i.e., the amount of heat to be stored can be increased as much as one wishes via the number of modules. Each module HM is connected to the first heat transfer system 159 via two lines (without reference number).

The first heat transfer system 159 shown in FIG. 6 is an open system, meaning that it works with ambient air as a heat carrier. Ambient air can be suctioned via the lines 165, or air from the high-temperature heat storage unit 112-HM can be emitted into the environment. The high-temperature heat storage unit 112-HM contains a blower HF and flaps H1 to H11. With the flaps H2 to H5, the flow direction of the heat carrier can be reversed. It is also possible for a second blower (not pictured) that conveys in the opposite direction to be installed.

The lines within the high-temperature heat storage unit 112-HM have no reference number, in the interest of comprehensibility. The first heat transfer system 159 is connected to the first heat exchanger 116 via the lines 118. One can conceivably assign the part of the first heat exchanger 116 through which the air from the heat carrier passes to the first heat transfer system 159.

In FIG. 6, the flaps H1 to H11 are positioned such that the storage module HM1 is loaded, wherein ambient air is used as a heat carrier. The ambient air required for the loading is suctioned by the blower HF via the line 165.1 and the open flap H1, and fed to the first heat exchanger 116 via the open flap H2. In the first heat exchanger 116, the work medium 108 of the cycle emits its high-temperature heat into the ambient air (heat carrier).

The now hot air is fed into the module HM1 via lines and the open flap H6. In the module HM1, the heat carrier "air" simultaneously passes through the storage material in the module HM1 (e.g., sand, grit, gravel, stones, ceramic granulate, metal oxide/silicate granulate, etc.) and transfers the heat to the storage material. The cooled air then leaves the module HM1 of the high-temperature heat storage unit 112-HM. Once the module HM1 is fully loaded, the module HM2 is activated in that the flap H6 is closed and the flap H7 is opened. In this manner, the modules HM1 to HM5 can be loaded in succession.

It is also possible to simultaneously load multiple modules HM in parallel. To do so, only the respective flaps must be open. For example, when loading the modules HM3 and HM4 in parallel, the flaps H8 and H9 must be open; the flaps H6, H7, and H10 remain closed in order to prevent passage through the modules HM1, HM2, and HM5.

Figure 13:
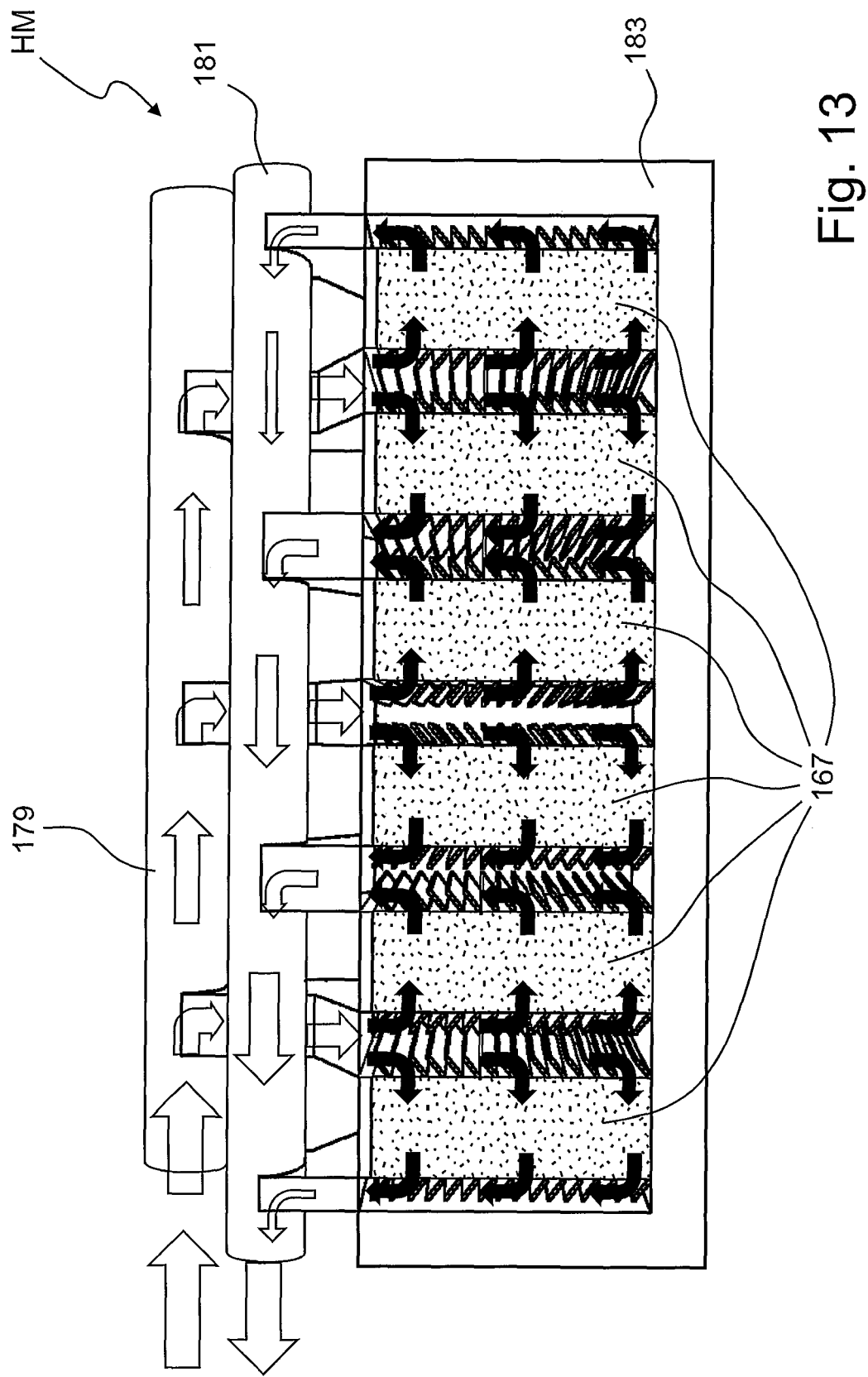
FIGS. 13 and 14: Cross sections through example variants of storage modules according to the invention.
Figure 14:
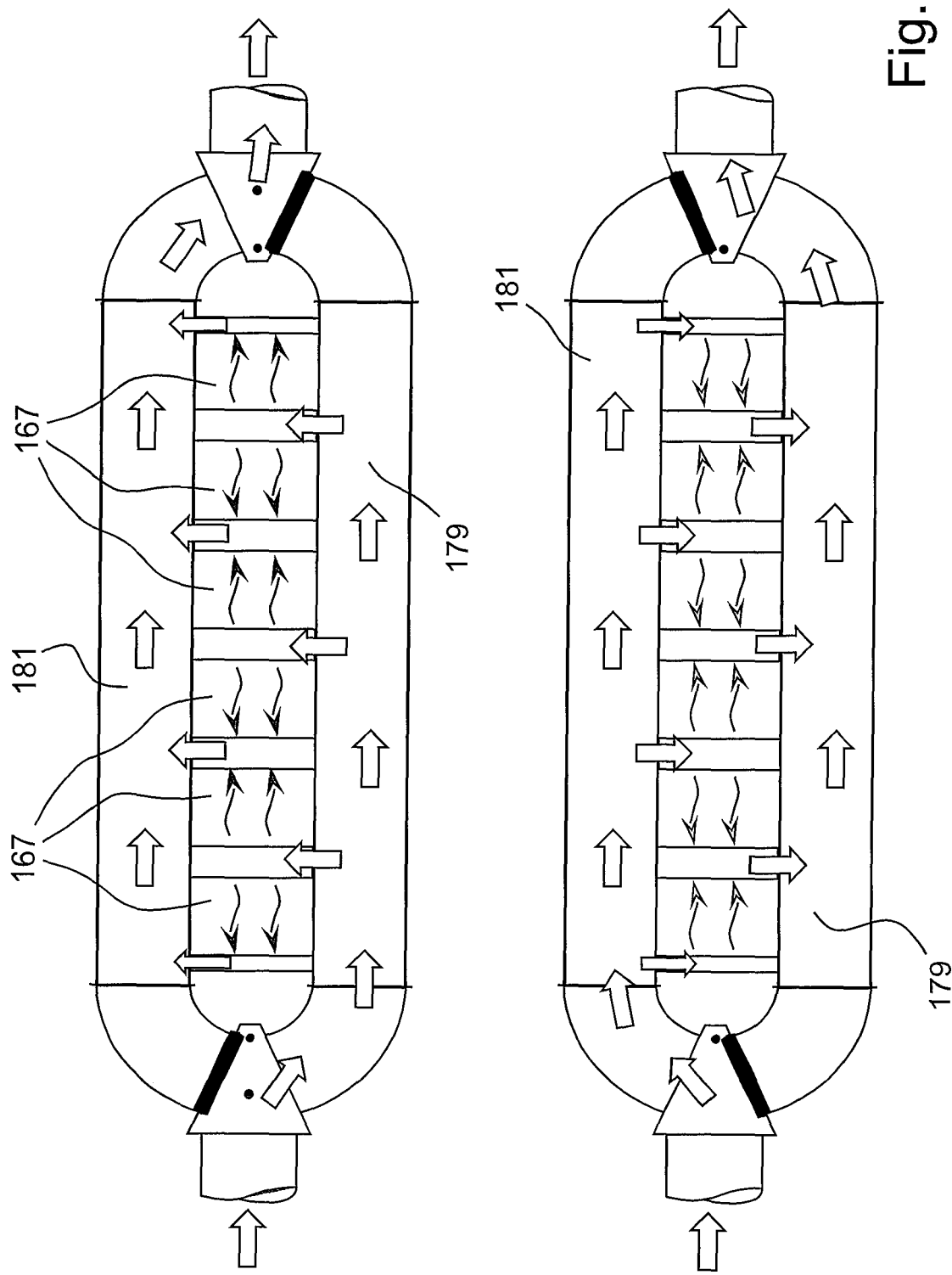

It can often be beneficial if, shortly before a module HM has been fully loaded and the temperature behind the module being loaded is increasing (this is the case when the thermocline has reached the exit surface of a storage material wall; see the description of FIGS. 13 and 14), a second loaded module in succession behind the nearly fully loaded module is activated. This can prevent heat loss.

Figure 7:
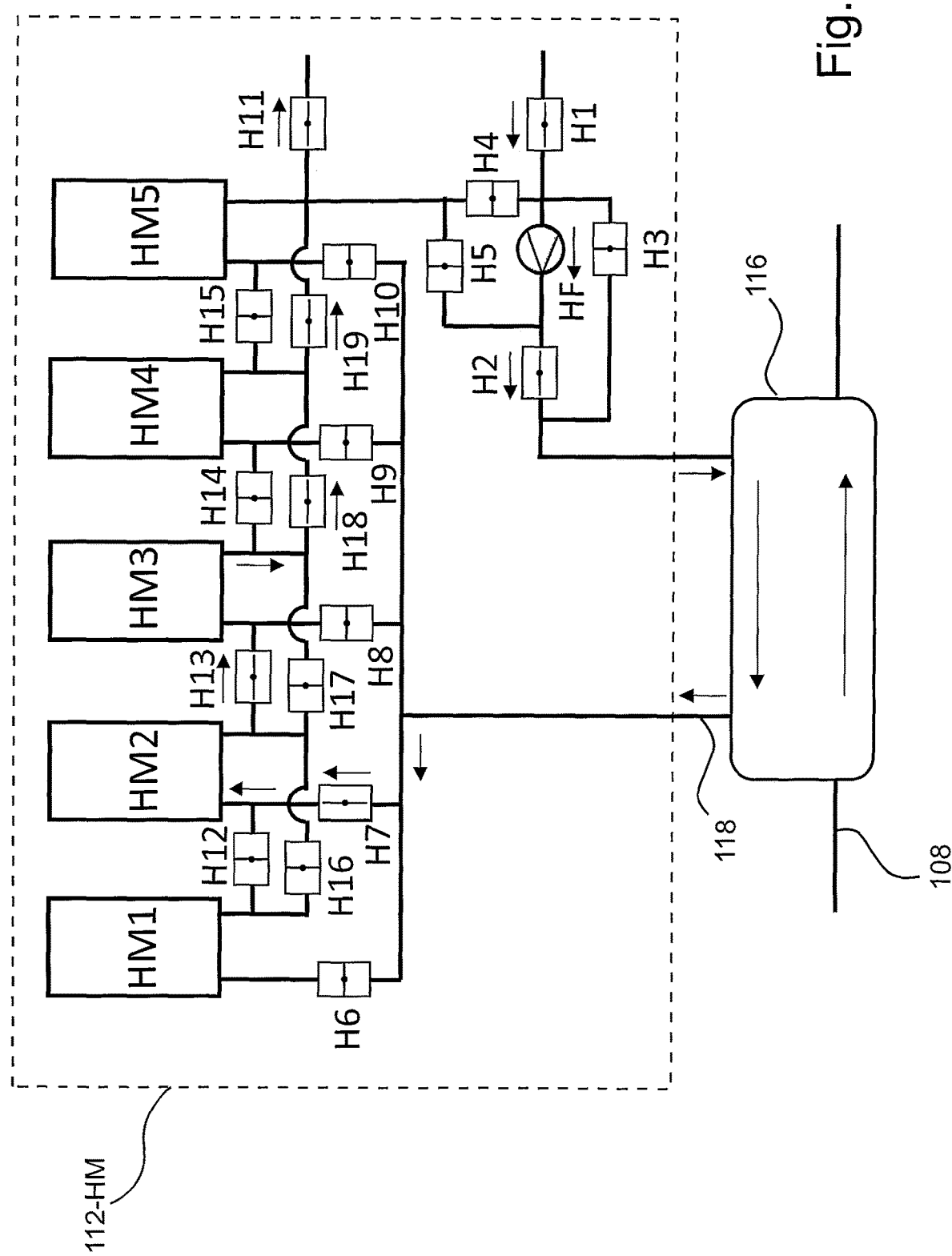

FIG. 7 shows an exemplary switch position of a high-temperature heat storage unit in which this type of operation is possible. More flaps are required in this case than in the example variant shown in FIG. 6. The additional flaps are labelled with H12, H13, H14, H15, H16, H17, H18, and H19. In this switch variant, multiple modules can be loaded or unloaded in parallel, or also operated in succession.

FIG. 7 shows the loading of the modules HM2 and HM3, which are loaded in succession. In this variant, the ambient air flows through the open flap H1 as a heat carrier medium 118, followed by the blower HF and the flap H2, and is heated in the heat exchanger 116. Via corresponding lines and the flap H7, the hot air is now fed into the module HM2 and flows through the storage material there. If the thermocline reaches the exit surface of the heat exchanger from the storage system walls, the air leaves the module HM2 at a higher temperature than would be the case if the module HM2 were not so fully loaded. In order not to lose this heat, this only partially cooled air is fed through the open flap H12 into the not yet fully loaded module HM3. After the air has emitted its residual heat into the storage material in the module HM3, the fully cooled air leaves the high-temperature heat storage unit via the open flaps H18, H19, and H11.

Loading is also possible if the first heat transfer system 159 is operated as a closed system. Then the flaps H1 and H11 are closed and the flap H4 is open. Then the heat carrier circulates in the first heat transfer system 159.

Of course, loading is also possible if the first heat transfer system 159 is operated as a closed system. The system must be closed if a suitable gas is to be used as a heat carrier (e.g., nitrogen $N_2$, argon Ar, or carbon dioxide $CO_2$). The flaps H1 and H11 are omitted in closed system operation.

Figure 8:
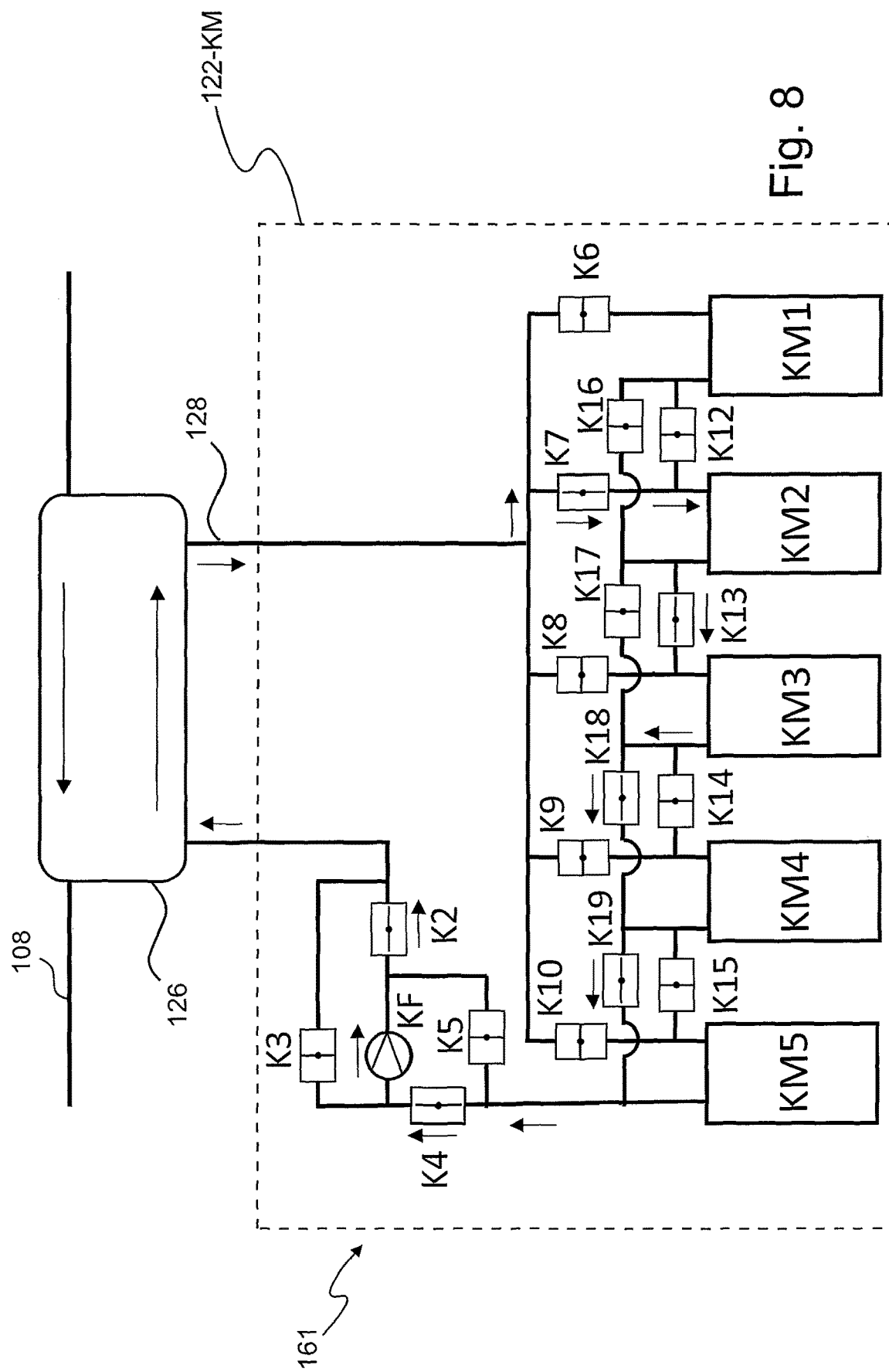

The cold storage unit 122-KM and the second heat transfer system 161 are depicted in somewhat greater detail in FIG. 8. The cold storage unit 122-KM comprises multiple cold storage modules KM1 to KMS, wherein the number of modules can be freely determined. Essentially, the number of modules can be as high as one wishes, i.e., the amount of the cold being stored can be freely determined via the number of modules. Each module KMI is connected to the second heat transfer system 161 via two lines (without reference number). The number of modules HM and KM does not have to be equal.

The second heat transfer system 161 is always a closed system, as it cannot work with ambient air as a heat carrier. The cold storage unit 122-KM contains a blower KF as well as flaps K2 to K15. With the flaps K2 to K5, the flow direction of the heat carrier can be reversed.

The lines within the cold storage unit 122-KM have no reference number, in the interest of comprehensibility. The second heat transfer system 161 is connected to the second heat exchanger 126 via the lines 128.

FIG. 8 shows the second heat transfer system 161 when loading the cold storage unit 122-KM, specifically the module KM2. The heat carrier is cooled in the second heat exchanger 126 and the heat carrier is fed into the module KM2 via one of the lines 128 and the open flap K7. When passing through the module KM2, the heat carrier cools the storage material and the heat carrier warms up.

After leaving the module KM2, the heat carrier is fed into the module KM3 via the open flap K13, i.e., in this example the two modules KM2 and KM3 are successively traversed by the heat carrier. The "heated" heat carrier is then fed into the blower KF via the open flaps K18, K19, and K4. The blower KF conveys the heat carrier via the open flaps K2 and the other line 128 back to the second heat exchanger 126. There the heat carrier emits its heat onto the work medium of the cycle 108 flowing against the flow direction; the heat carrier cools and is then fed back to one or multiple modules KM.

Figure 9:
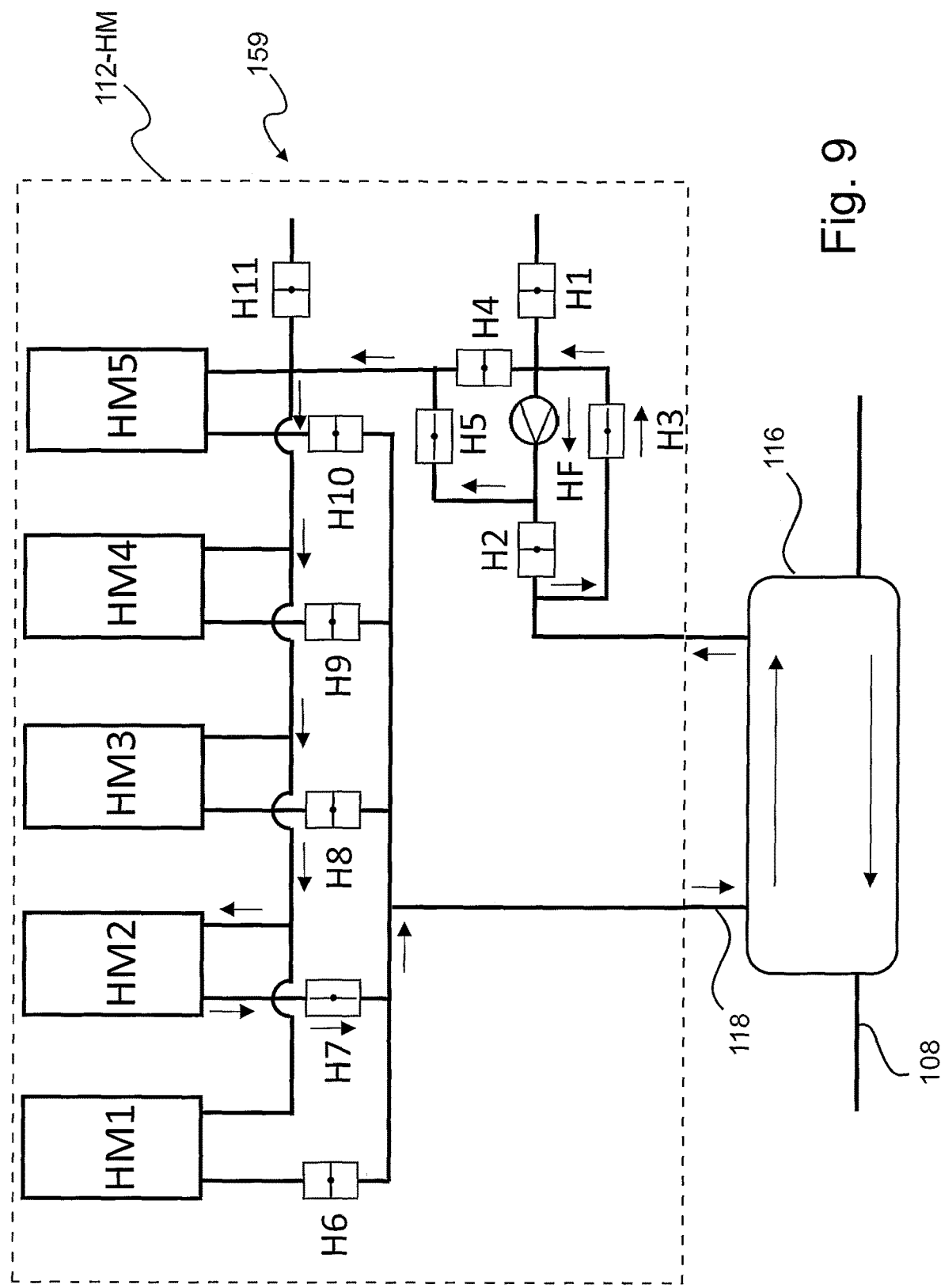

In FIG. 9, the unloading of the module HM2 of the high-temperature storage unit 112-HM is shown as a closed process, i.e., the flaps H1 and H11 are closed.

The flow direction is reversed when unloading. This can occur via a second blower working in the opposite direction from the loading process, or via the same blower HF with which the flow direction is reversed via the flaps H2 to H5. I.e., when unloading, the heat carrier (air, nitrogen, argon, etc.) suctioned from the first heat exchanger 116 flows through the open flap H3, and then the blower HF, which conveys the heat carrier through the open flap H5 to the module HM2 via the lines. The heat carrier traverses the module HM2 and the storage material therein, and flows through the open flap H7 to the first heat exchanger 116. The cooled heat carrier is now fed back into the blower HF via a line 118 and the flap H3.

Figure 10:
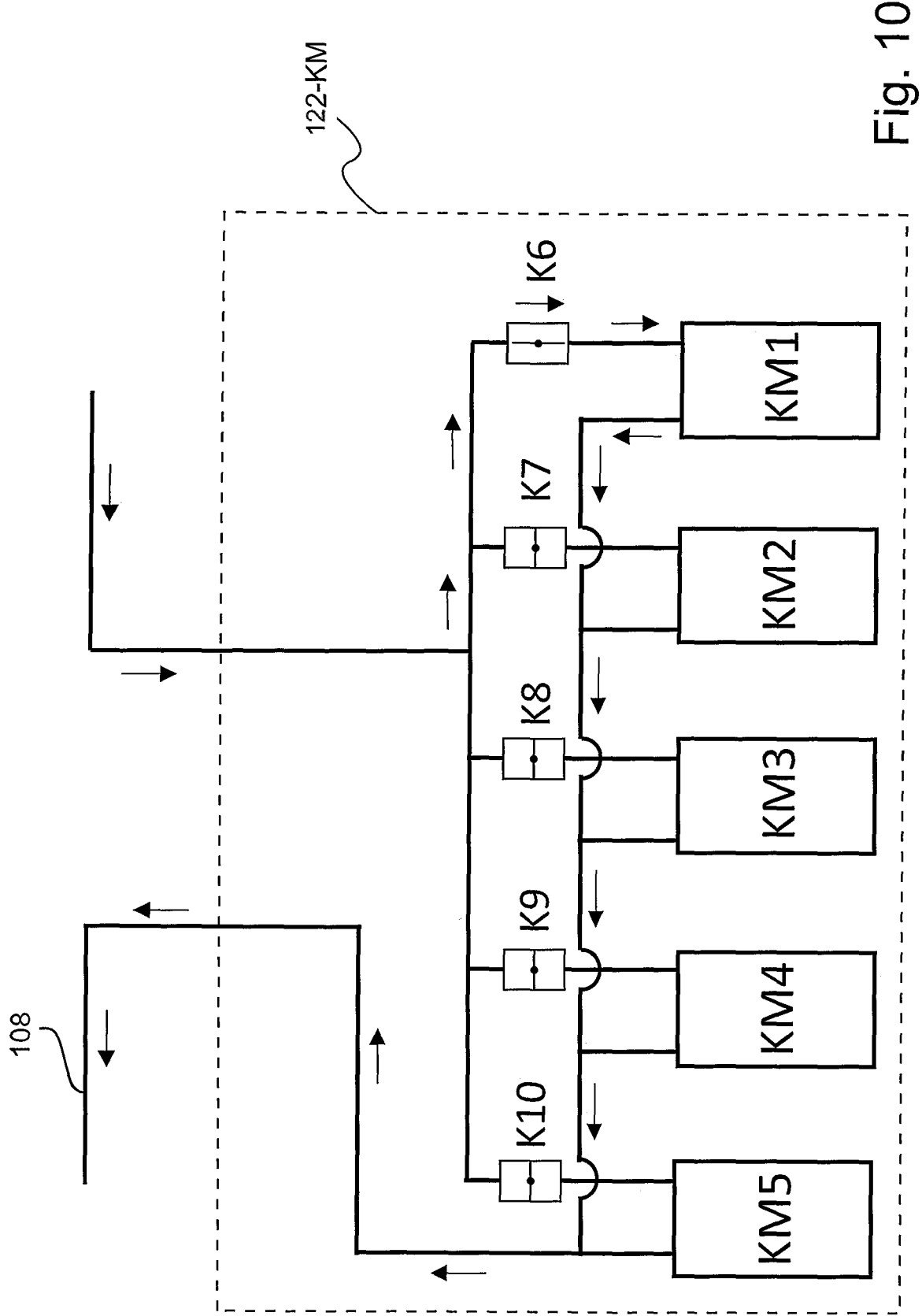
Figure 11:
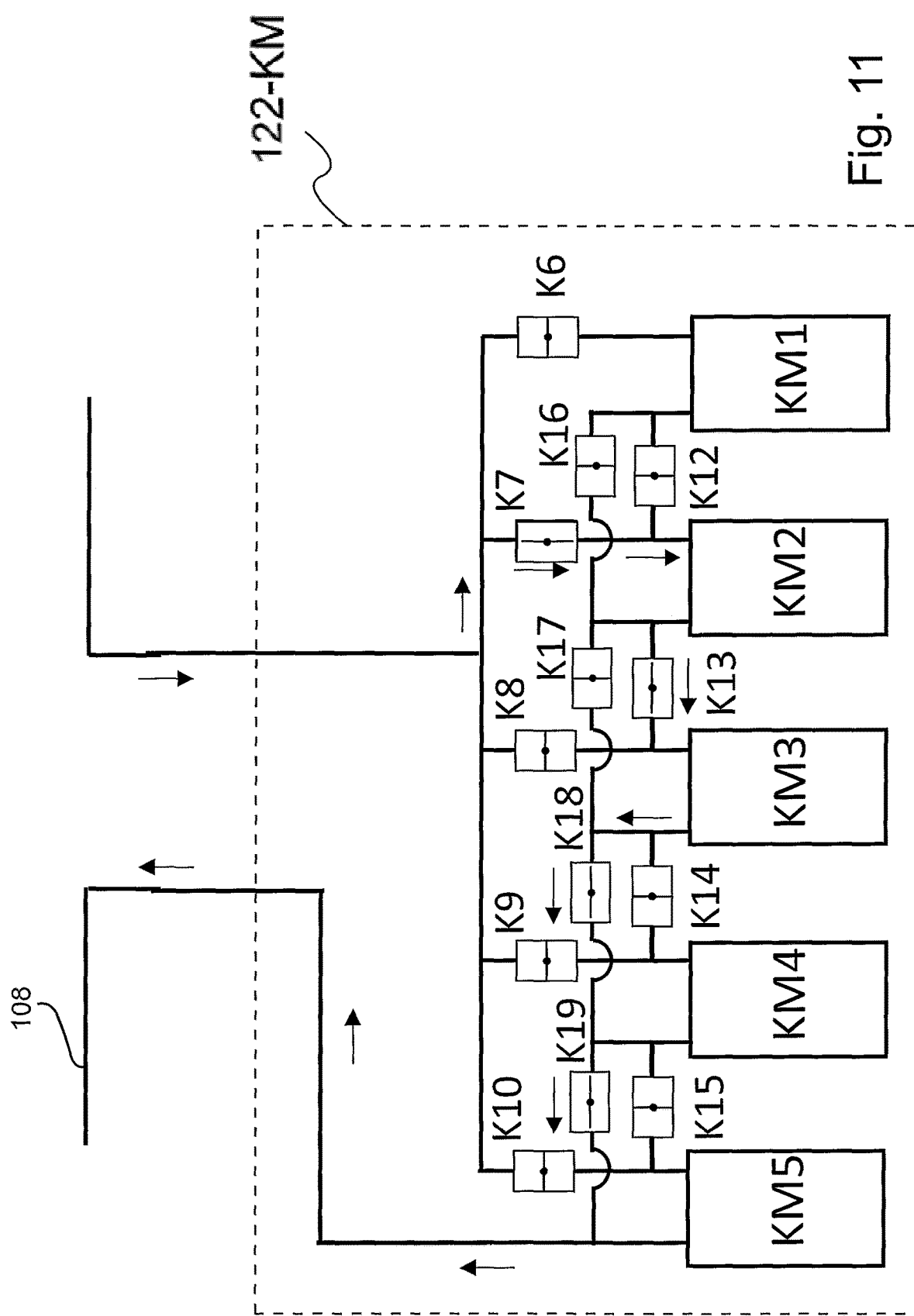

FIGS. 10 and 11 show the loading of the cold storage unit 112-KM without a second heat exchanger 126 and without a second heat transfer system 161 (see also FIGS. 4 and 5).

FIG. 10 shows the direct loading of the module KM1. The work medium of the cycle is conveyed into the module KM1 via a line and the open flap K6 after it has left the turbine and become very cold. When traversing the module KM1, the work medium cools the storage material and heats up. Then the work medium is conveyed to the compressor.

FIG. 11 shows the loading of the modules KM2 and KM3 in succession, i.e., the flaps K7 and K13 are open and the modules KM2 and KM3 are successively traversed by the work medium. The "heated" work medium reaches the compressor via the open flaps K18, K19.

Figure 12:
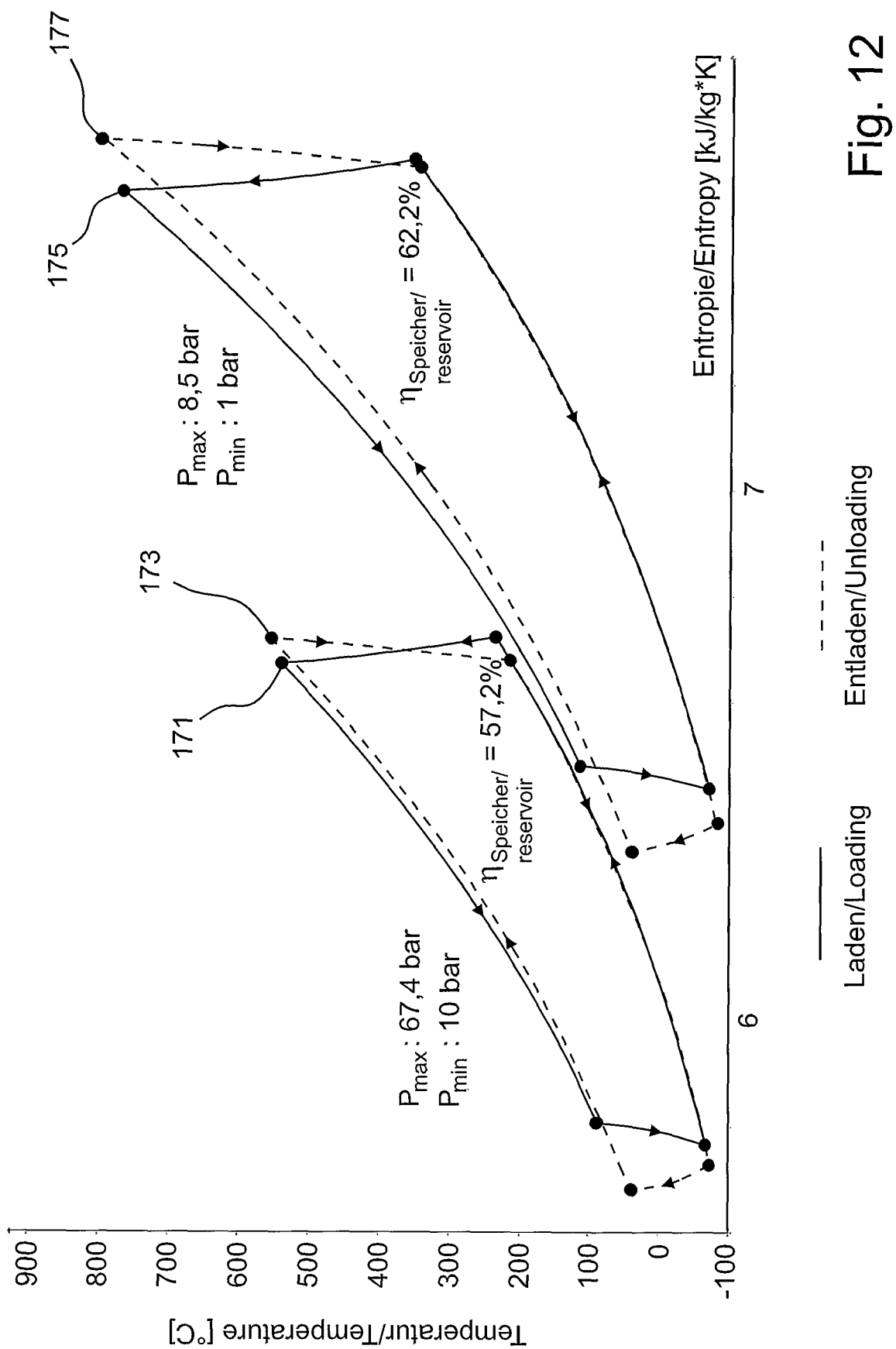
FIG. 12: T-S diagrams of a thermal energy storage system according to the state of the art and a thermal energy storage system according to the invention.

In FIG. 12, the thermal energy storage system known from US 2019/0195571 A1 with liquid salt and liquid cooling agent as a heat storage unit is compared with the thermal energy storage system described by the invention. FIG. 12 shows two T-S diagrams for selected practical parameters for terminal temperature differences, pressure losses, and separate consumption, and both methods aim to store the same electrical output or power quantity.

The line 171 shows the counterclockwise heat pump cycle of the thermal energy storage system used for loading known from US 2019/0195571 A1.

The line 173 shows the clockwise cycle of the thermal energy storage system used for unloading known from US 2019/0195571 A1.

Accordingly, the line 175 shows the counterclockwise heat pump cycle of the thermal energy storage system described by the invention used during loading.

The line 177 shows the clockwise cycle of the thermal energy storage system described by the invention during unloading.

Comparison of the T-S diagrams and the pressure ranges specified in FIG. 12 ($p_{max}$ 67.4 bar vs $p_{max}$=8.5 bar) shows that the thermal energy storage system described by the invention is very beneficial with regard to system security. Comparison of the current-to-current efficacies, with 62.2% to 57.2%, clearly speaks to the benefit of the thermal energy storage system described by the invention.

FIG. 13 shows a cross section through an example variant of a storage module HM or KM with six walls 167 consisting of storage material. The walls 167 are porous so that the heat carrier (air, gas) of the heat transfer systems 159 or 161 can flow through them. The preferred mineral storage material (sand, gravel, basalt, ceramic granulate, metal oxide/ silicate granulate, etc.) has an average diameter of less than 8 mm, preferably 1-3 mm, and is arranged in multiple layers or walls 167 that are horizontally traversed simultaneously. A radial traversal of storage layers is also possible. DE 102010 055 997 A1 and DE 10 2010 033 571 A1 by the applicant show and explain various arrangements of the storage material and flow directions.

The number and thickness of the walls 167 depend on the respective requirements of the storage system (e.g., maximum permissible pressure loss). The thickness is in the range of 0.3-2.5 m.

The heat carrier is conveyed into three interim spaces between the walls 167 via a line 179.

The heat carrier is conveyed from two interim spaces between two walls 167 via a line 181. The line 181 is connected with the interim spaces between a housing 183 of the storage module HM, KM. This makes it possible for all six walls 167 to be traversed simultaneously and across their entire surface by the heat carrier. This considerably reduces the pressure loss and still allows for very good and quick heat transfer from the heat carrier onto the storage material, and vice versa.

FIG. 13 shows the inflow and outflow lines 179, 181 above the storage material, although these can insert or exhaust the heat carrier (gas or air) between the walls from the side or from below. Any combinations are possible, e.g., the storage module can be loaded from one side and unloaded from the other side. As already mentioned, the storage material can be traversed by other means, e.g., radially or from below upward.

FIG. 14 shows cross sections through another example variant of a storage module HM or KM with six walls 167 consisting of storage material. The walls 167 are porous so that the heat carrier (air, gas) of the heat transfer systems 159 or 161 can flow through the walls.

The loading of the storage module is shown in the top of FIG. 14. The heat carrier is conveyed into three interim spaces between the walls 167 via a line 179.

The cooled heat carrier is conveyed from two interim spaces between two walls 167 via the line 181. The line 181 is also connected with the interim spaces between a housing of the storage module HM, KM. This makes it possible for all six walls 167 to be simultaneously traversed by the heat carrier across their entire surface. This considerably reduces pressure loss and yet also allows for a very good and quick heat transfer from the heat carrier to the storage material, and vice versa.

In this example variant, the lines 179 and 181 are connected with the heat transfer system 159 or 161 via flap boxes in each of which one flap is positioned.

The top of FIG. 14 shows the loading of a storage module HM. The bottom of FIG. 14 shows the unloading of a storage module HM. By switching the two flaps, the flow direction of the heat carrier of the heat transfer system through the storage walls 167 is reversed. This once again reduces energy loss during loading and unloading. Direct integration of a storage module into a gas flow is possible without the gas flow having to change direction between the loading and unloading.

It is recommended that the outer dimensions of a storage module HM, KM match those of a transport container. This means the modules can be manufactured in a factory and affordably transported to the place of use. Alternatively, the modules can be assembled directly on the building site. Considerably greater dimensions are thus of course possible.

Generally, the housing and the bearing elements are made from steel, but other materials such as concrete can be used for on-site assembly due to the minor over- and underpressures relative to the environment. The filling with storage material and closing of the modules preferably occur following assembly on site.

Arrangement of the storage material in the form of gas- or air-permeable walls inside the module creates a large inflow surface. This reduces the inflow velocity of the gaseous heat carrier onto the walls compared to the flow velocities in the lines. This in turn results in an exponential reduction of the pressure loss when traversing the storage material. The energy requirements for the blower of heat transfer systems 159 and 161 are thus reduced.

Through the use of fine-grained/granulated storage material, the thermocline (threshold layer between the hot and cold material in the flow direction) is very narrow (approx. 5-35 cm). The large surface of the fine-grained storage material facilitates very good heat exchange and high thermal output during loading and unloading. The large surface and narrow thermocline result in the temperature of the heat carrier remaining very stable during traversal of the storage material during unloading. It only decreases more strongly when the thermocline reaches the exit surface.

The modular structure, flexibility with regard to the number and size of the storage material walls in a module, and the option to load and unload the modules in parallel, means that not only can large amounts of heat be stored, but it is also possible to select different thermal outputs during loading and unloading. For example, a very high heat output can be implemented in a short time when unloading (e.g., 100 MW for 2 hours in that ten modules are simultaneously traversed in parallel). During unloading, low output can then be implemented over a long period (e.g., 20 MW for 10 hours in that two modules are simultaneously unloaded in parallel, and then the next two modules are loaded).

In order to keep the heat at a useably high level for a long period, the modules and the lines must be well insulated against the corresponding heat, and traversal of the modules in idle mode through natural convection must be prevented via closure of the flaps.

It has proven beneficial that the flow direction through the storage material is reversed between loading and unloading.

If the storage modules are installed in a system comprising the same flow direction regardless of loading and unloading, two suitable switchover flaps before and after a storage module can reverse the flow through the storage material. Such an arrangement of switchover flaps in a module is shown in various switch positions in FIG. 14. The storage module is loaded in the top of FIG. 14*a*, with the hot gas flowing in and then being led from above through the inflow canal and between the storage material walls. Following the through-flow, the gas leaves the module by flowing through the storage material walls or outside between the module walls and the outer storage material walls and up to the outflow canal, and leaving the module in a cooled state. Both flaps are switched over in the bottom of FIG. 14, and the flow direction through the module is reversed.

Should only one of the two flaps be switched over, a bypass has been created and the gas can flow through the respective switched over line. Such a module with such switched over flaps can also be of interest if a continuously stable gas temperature or narrow temperature range is present behind the module (e.g., in order to maintain a chemical process), with the temperature of the inflowing gas fluctuating considerably.

The invention claimed is:

1. Thermal energy storage system comprising a high-temperature heat storage unit, a cold storage unit, at least one compressor (102), and at least one turbine (104),
    wherein the high-temperature heat storage unit, the at least one turbine (104) of the cold storage unit, and the at least one compressor (102) are connected to each other via lines such that a gaseous work medium circulating in the lines can either run through a counterclockwise heat pump cycle or a clockwise work cycle,
    wherein an outlet (151) of the at least one compressor (102) is connected with an inlet (153) of the at least one turbine (104), wherein an outlet (155) of the turbine (104) is connected with an inlet (157) of the compressor (102), wherein there is a first heat exchanger (116) between the outlet (151) of the compressor (102) and the inlet (153) of the at least one turbine (104), wherein there is a second heat exchanger (126) between the outlet (155) of the turbine (104) and the inlet (157) of the compressor (102), wherein one side each of the first heat exchanger (116) and the second heat exchanger (126) is traversed by the gaseous work medium,
    characterized in that,
    the high-temperature heat storage unit (112-HM) and the cold storage unit (112-KM) are a packed-bed storage unit,
    there is a first heat transfer system (159) between the first heat exchanger (116) and the high-temperature heat storage unit (112-HM),
    there is a second heat transfer system (161) between the second heat exchanger (116) and the cold storage unit (122-KM),
    and
    the first heat transfer system (159) and the second heat transfer system (161) work with a gaseous heat transfer medium.

2. Thermal energy storage system comprising a high-temperature heat storage unit, a cold storage unit, at least one compressor (102), and at least one turbine (104),
    wherein the high-temperature heat storage unit, the at least one turbine (104), the cold storage unit, and the at least one compressor (102) are connected to each other via lines such that a gaseous work medium flowing in the lines can either run through a counterclockwise heat pump cycle or a clockwise work cycle,
    wherein an outlet (151) of the at least one compressor (102) is connected with an inlet (153) of the at least one turbine (104), wherein an outlet (155) of the turbine (104) is connected with an inlet (157) of the compressor (102), wherein there is a first heat exchanger (116) between the outlet (151) of the at least one compressor (102) and the inlet (153) of the at least one turbine (104), wherein one side of the first heat exchanger (116) is traversed by the gaseous work medium,
    characterized in that,
    the high-temperature heat storage unit (112-HM) and the cold storage unit (122-KM) are designed as a packed-bed storage unit,
    there is a first heat transfer system (159) between the first heat exchanger (116) and the high-temperature heat storage unit (112-HM),
    the first heat transfer system (159) works with a gaseous heat transfer medium, and
    the cold storage unit (122-KM) is integrated in the cycle between the outlet (155) of the at least one turbine (104) and the inlet (157) of the at least one compressor (102) such that the gaseous work medium flows through the cold storage unit (122-KM).

3. Thermal energy storage system according to claim 1, characterized in that the high-temperature heat storage unit (112-HM) and/or the cold storage unit (122-KM) consist of one or more storage modules (HM, KM) in which fine-grained/granulate, preferably mineral, storage material is present.

4. Thermal energy storage system according to claim 3, characterized in that the storage material in the one or more storage modules (HM, KM) is arranged in the form of air- or gas-permeable walls (167).

5. Thermal energy storage system according to claim 3, characterized in that the first heat transfer system (159) and the second heat transfer system (161) comprise at least one blower (HF, KF), pipelines and flaps (Hi, Kj), and are set up to load or unload the one or more storage modules (HM, KM) via activation of the flaps (Hi, Kj).

6. Thermal energy storage system according to claim 1, characterized in that the thermal energy storage system comprises a first compressor (104 E) for operation as a counterclockwise heat pump cycle, and a second compressor (102 B) for operation as a clockwise work cycle.

7. Thermal energy storage system according to claim 1, characterized in that the thermal energy storage system comprises a first turbine (102 E) for operation as a counterclockwise heat pump cycle, and a second turbine (104 B) for operation as a clockwise work cycle.

8. Thermal energy storage system according to claim 1, characterized in that the thermal energy storage system comprises at least one electrical machine (100, 101), and the at least one electrical machine (100, 101) is connected with the at least one compressor (102) and/or the at least one turbine (104).

9. Method for loading a thermal energy storage system according to claim 2, comprising the steps:
   operating at least one compressor and at least one turbine as a counterclockwise cycle, and
   operating the first heat transfer system (159) such that one or more storage modules (HM1 to HMn) are successively or simultaneously traversed by a heat carrier.

10. Method for loading a thermal energy storage system according to claim 1, comprising the steps:
    operating at least one compressor and the at least one turbine as a counterclockwise cycle,
    operating the first heat transfer system (159) such that one or more storage modules (HM1 to HMn) are successively or simultaneously traversed by a heat carrier, and
    operating the second heat transfer system (161) such that the one or more storage modules (KM1 to KMn) are successively or simultaneously traversed by the heat carrier.

11. Method for unloading a thermal energy storage system according to claim 1, comprising the steps:
    operating the at least one compressor and the at least one turbine as a clockwise work cycle, and
    operating the first heat transfer system (159) such that one or more storage modules (HM1 to HMn) are successively or simultaneously traversed by a heat carrier.

12. Method for loading a thermal energy storage system according to claim 1, comprising the steps:
    operating the at least one compressor and the at least one turbine as a clockwise cycle,
    operating the first heat transfer system (159) such that one or more storage modules (HM1 to HMn) are successively or simultaneously traversed by a heat carrier, and
    operating the second heat transfer system (161) such that the one or more storage modules (KM1 to KMn) are successively or simultaneously traversed by the heat carrier.

13. Method according to claim 9, characterized in that the flow direction of the heat carrier in the first heat transfer system (159) and/or the second heat transfer system (161) is reversed when "loading" and "unloading" operating modes are alternated.

14. Method according to claim 9, characterized in that the one or more storage modules (HM, KM) are individually loaded and/or unloaded.

15. Method according to claim 9, characterized in that multiple storage modules (HM, KM) are switched over successively or in parallel during loading and/or unloading.

16. Thermal energy storage system according to claim 2, characterized in that the high-temperature heat storage unit (112-HM) and/or the cold storage unit (122-KM) consist of one or more storage modules (HM, KM) in which fine-grained/granulate, preferably mineral, storage material is present.

17. Thermal energy storage system according to claim 16, characterized in that the storage material in the one or more storage modules (HM, KM) is arranged in the form of air- or gas-permeable walls (167).

18. Thermal energy storage system according to claim 16, characterized in that the first heat transfer system (159) and the second heat transfer system (161) comprise at least one blower (HF, KF), pipelines and flaps (Hi, Kj), and are set up to load or unload the one or more storage modules (HM, KM) via activation of the flaps (Hi, Kj).

19. Thermal energy storage system according to claim 2, characterized in that the thermal energy storage system comprises a first compressor (104 E) for operation as a counterclockwise heat pump cycle, and a second compressor (102 B) for operation as a clockwise work cycle.

20. Thermal energy storage system according to claim 2, characterized in that the thermal energy storage system comprises a first turbine (102 E) for operation as a counterclockwise heat pump cycle, and a second turbine (104 B) for operation as a clockwise work cycle.

* * * * *